United States Patent
Ogawa

(10) Patent No.: US 10,490,192 B2
(45) Date of Patent: Nov. 26, 2019

(54) APPARATUS, METHOD, NON-TRANSITORY COMPUTER-READABLE MEDIUM AND SYSTEM FOR MODIFYING VOICE RECOGNITION INFORMATION

(71) Applicant: SONY CORPORATION, Tokyo (JP)

(72) Inventor: Hiroaki Ogawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/307,621

(22) PCT Filed: Jul. 15, 2015

(86) PCT No.: PCT/JP2015/003573
§ 371 (c)(1),
(2) Date: Oct. 28, 2016

(87) PCT Pub. No.: WO2016/009646
PCT Pub. Date: Jan. 21, 2016

(65) Prior Publication Data
US 2017/0053650 A1    Feb. 23, 2017

(30) Foreign Application Priority Data
Jul. 16, 2014    (JP) .................. 2014-145795

(51) Int. Cl.
| G10L 15/30 | (2013.01) |
| G10L 15/22 | (2006.01) |
| G10L 15/06 | (2013.01) |
| G10L 15/08 | (2006.01) |
| G10L 25/51 | (2013.01) |

(52) U.S. Cl.
CPC ............ *G10L 15/30* (2013.01); *G10L 15/063* (2013.01); *G10L 15/08* (2013.01); *G10L 15/22* (2013.01); *G10L 25/51* (2013.01); *G10L 2015/0635* (2013.01); *G10L 2015/088* (2013.01)

(58) Field of Classification Search
USPC ................................. 704/270, 275
See application file for complete search history.

(56) References Cited

U.S. PATENT DOCUMENTS

| 5,737,723 | A | * | 4/1998 | Riley | G10L 15/187 704/243 |
| 5,884,266 | A | * | 3/1999 | Dvorak | H04M 3/493 704/270.1 |
| 6,330,539 | B1 | * | 12/2001 | Takayama | G10L 15/1822 704/251 |
| 6,413,079 | B1 | * | 7/2002 | Lyons | F24C 3/122 126/512 |
| 6,615,177 | B1 | * | 9/2003 | Rapp | G10L 15/26 704/270 |
| 6,778,098 | B2 | * | 8/2004 | Geurts | G08C 17/02 340/12.11 |

(Continued)

FOREIGN PATENT DOCUMENTS

EP    1045374 A1 * 10/2000    ............ G10L 15/26

*Primary Examiner* — Abul K Azad
(74) *Attorney, Agent, or Firm* — Paratus Law Group, PLLC

(57) ABSTRACT

There is provided an apparatus including a communication unit configured to transmit information permitting a second apparatus to modify stored voice recognition information based on a relationship between the first apparatus and the second apparatus.

21 Claims, 13 Drawing Sheets

(56) References Cited

U.S. PATENT DOCUMENTS

| | | | |
|---|---|---|---|
| 9,445,209 B2* | 9/2016 | Dadu | G06F 3/167 |
| 2008/0221896 A1* | 9/2008 | Cai | G10L 15/01 |
| | | | 704/270.1 |
| 2013/0325446 A1* | 12/2013 | Levien | G10L 15/30 |
| | | | 704/201 |
| 2013/0325451 A1* | 12/2013 | Levien | G10L 21/00 |
| | | | 704/201 |
| 2013/0339028 A1* | 12/2013 | Rosner | G10L 15/222 |
| | | | 704/275 |
| 2015/0170664 A1* | 6/2015 | Doherty | G06F 3/167 |
| | | | 704/275 |
| 2016/0182938 A1* | 6/2016 | James | H04N 21/42203 |
| | | | 704/275 |

* cited by examiner

[Fig. 1]
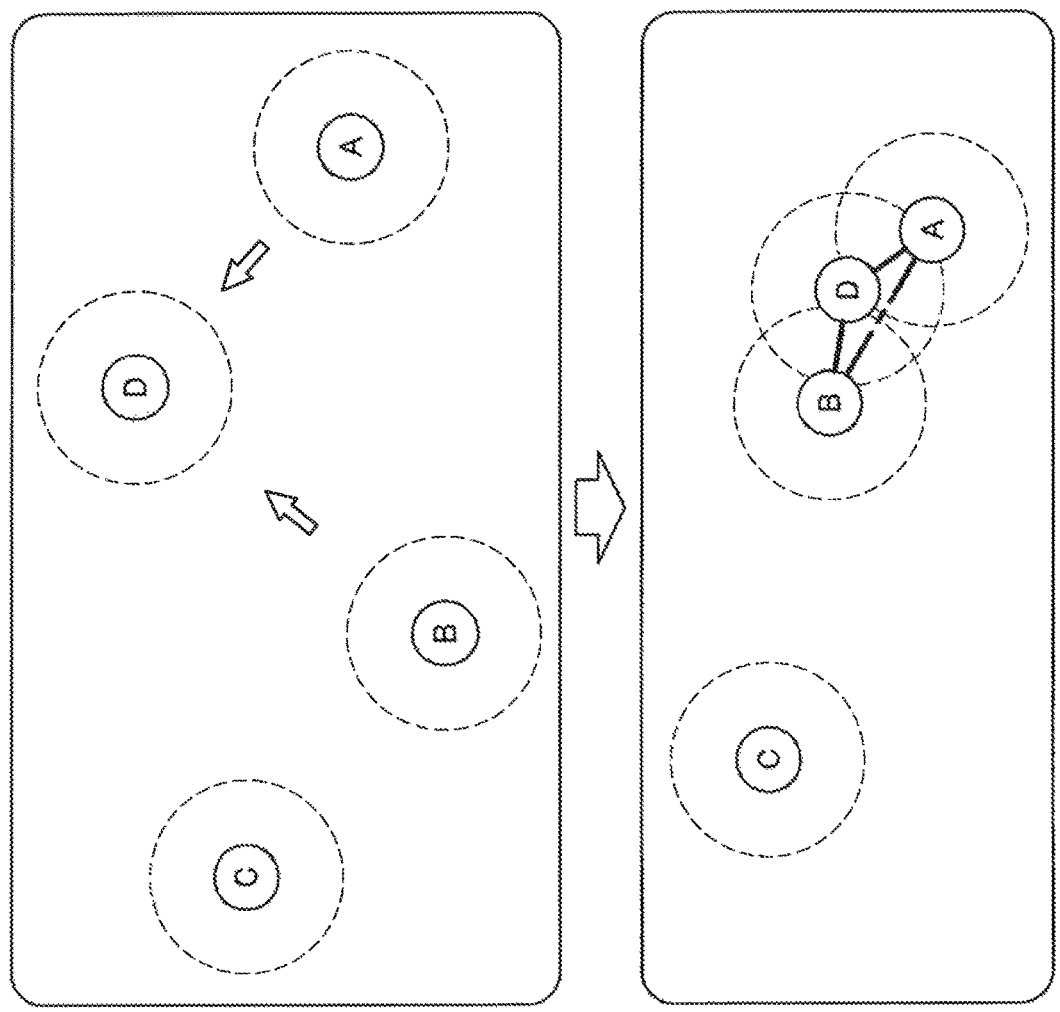

[Fig. 2]
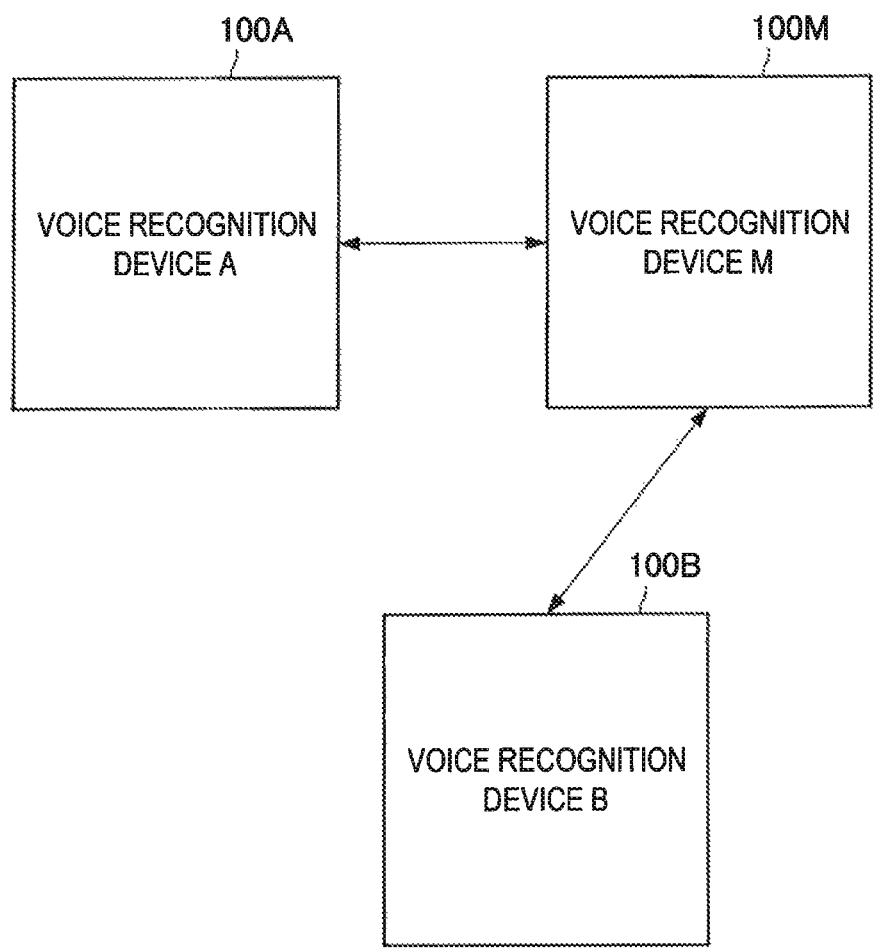

[Fig. 3]
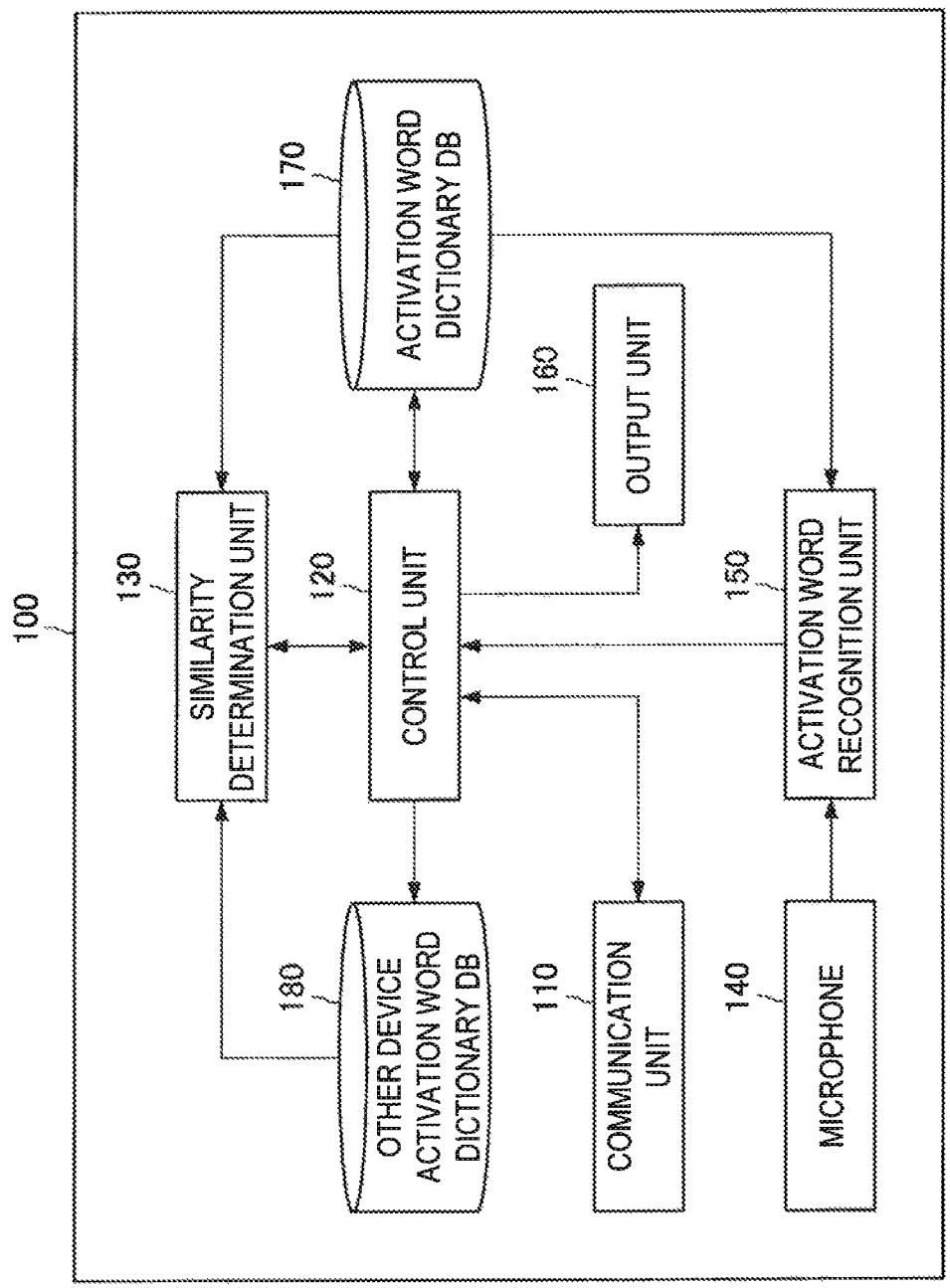

[Fig. 4]

| DEVICE NAME | IDENTIFICATION INFORMATION | ACTIVATION WORD | UPDATE DATE AND TIME |
|---|---|---|---|
| smartphone01 | SN123456 | JOEY | 201310021917 |
| smartphone02 | SN999999 | BOBBY | 201401231900 |

[Fig. 5]
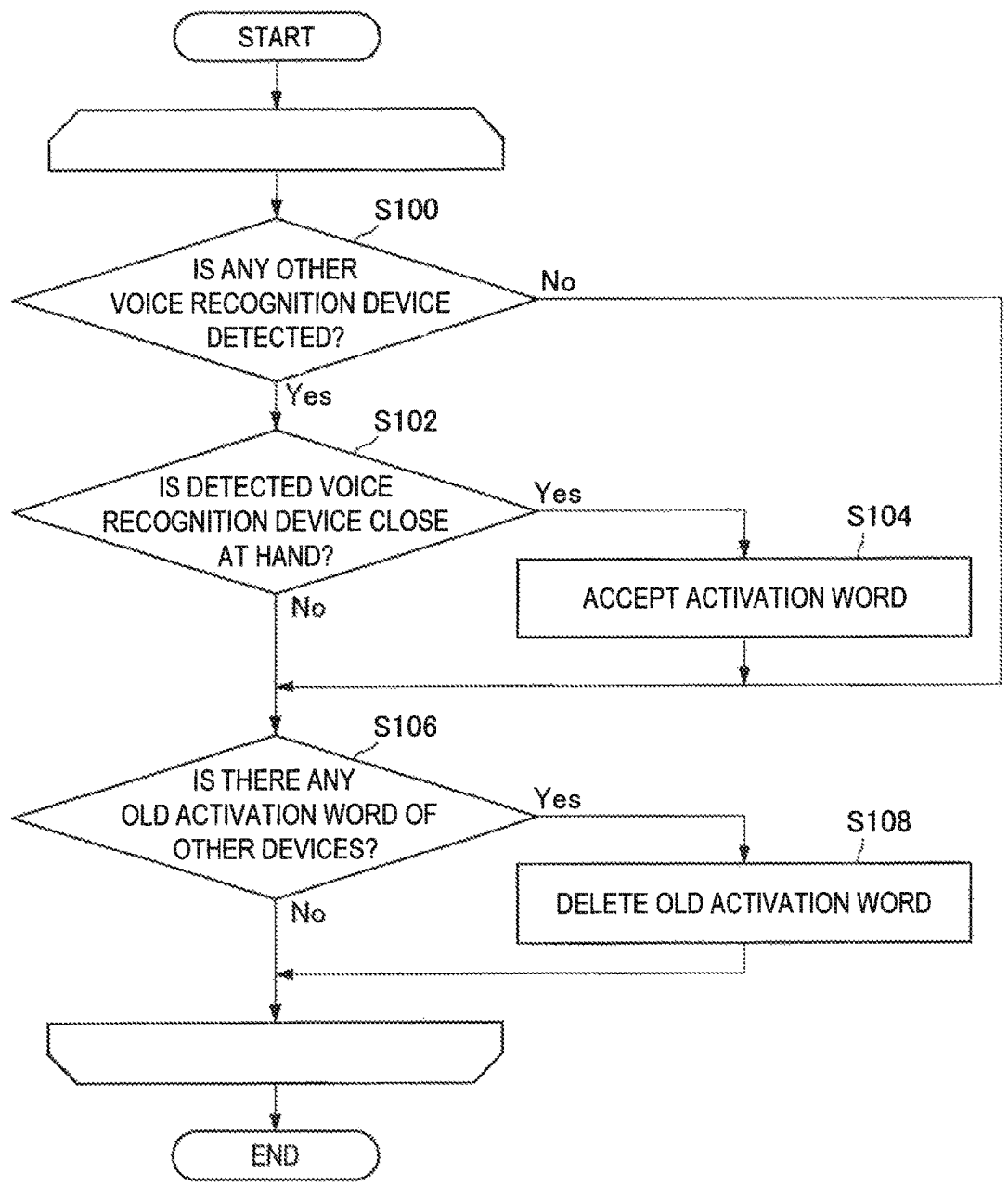

[Fig. 6]
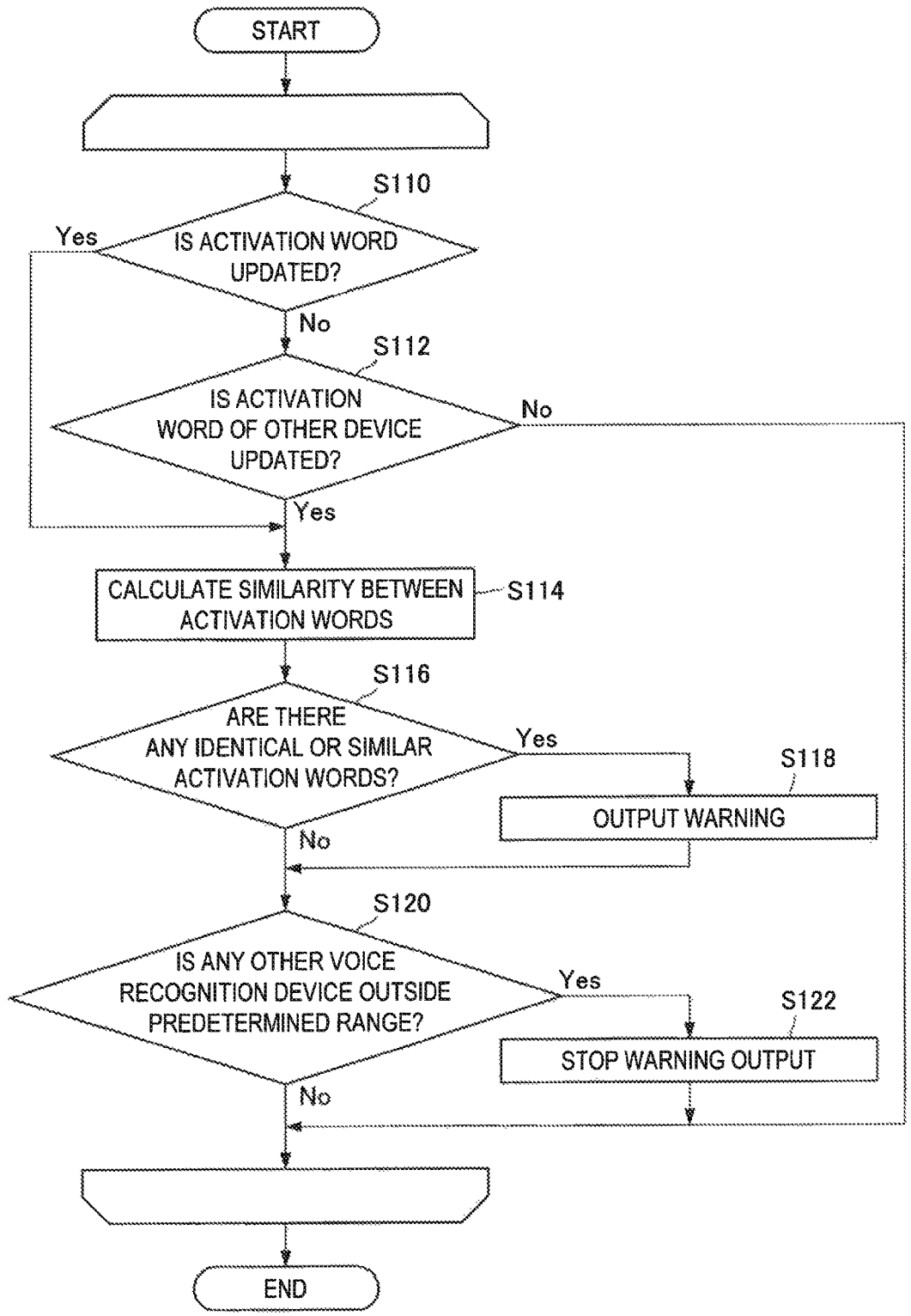

[Fig. 7]
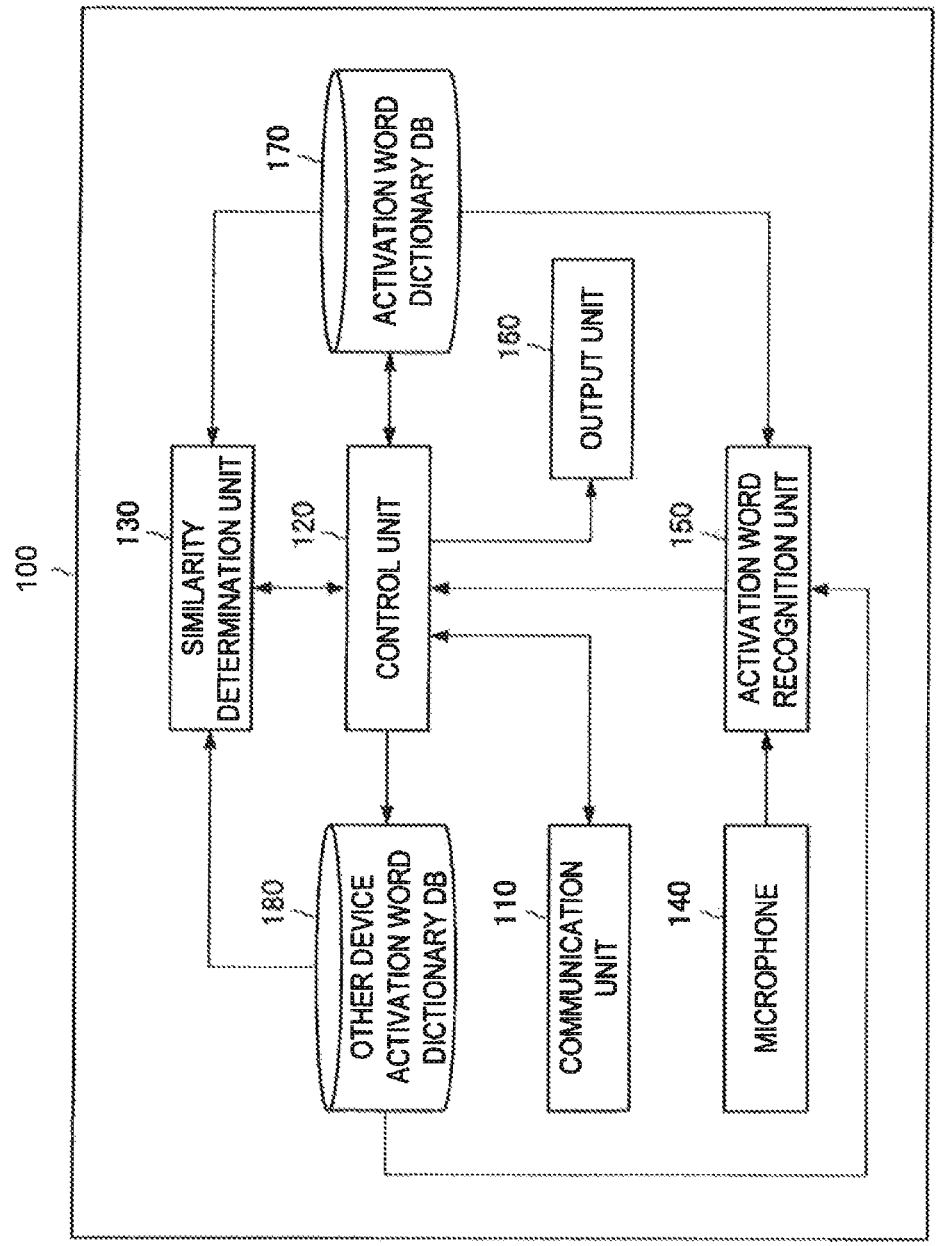

[Fig. 8]
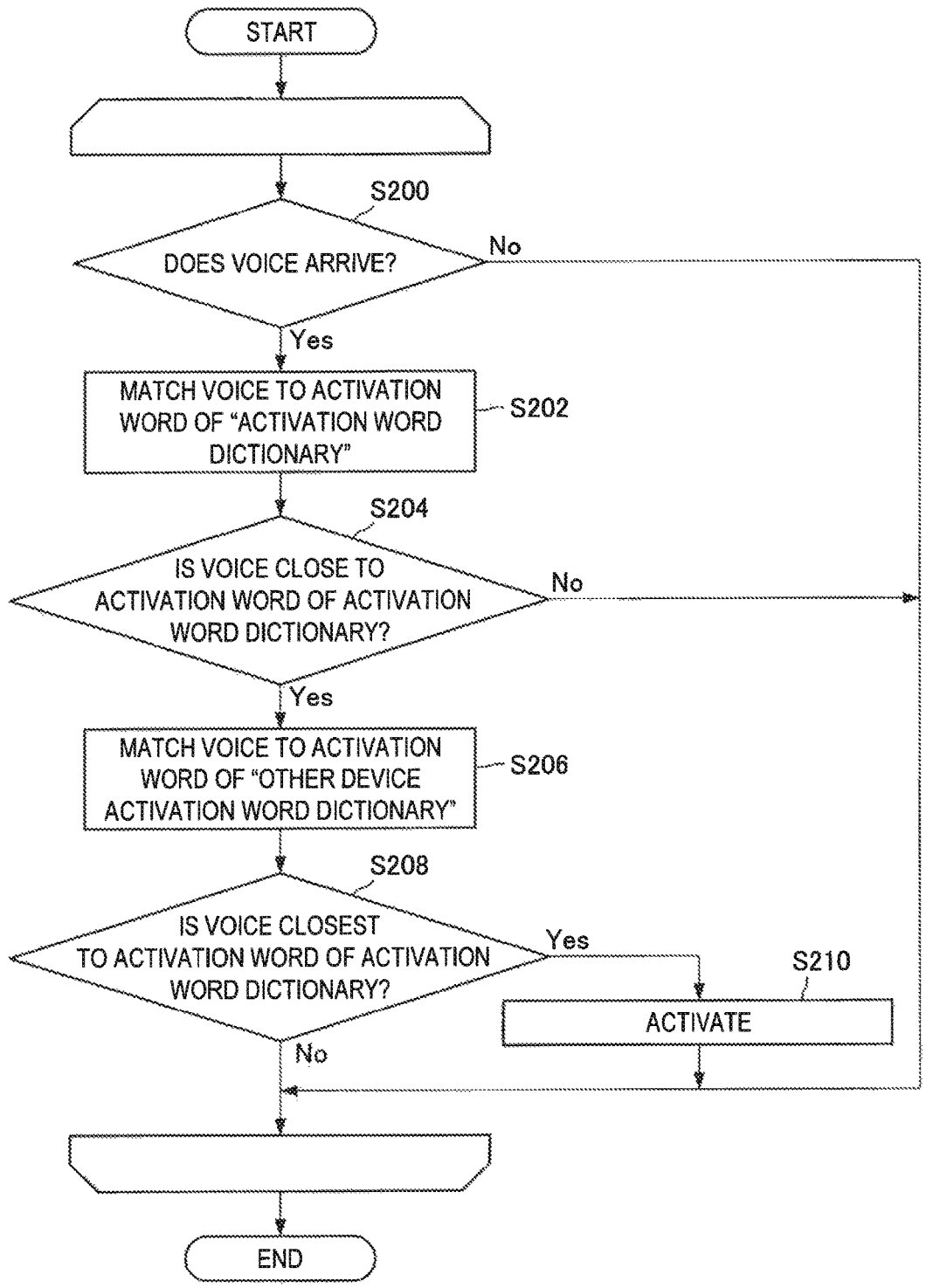

[Fig. 9]
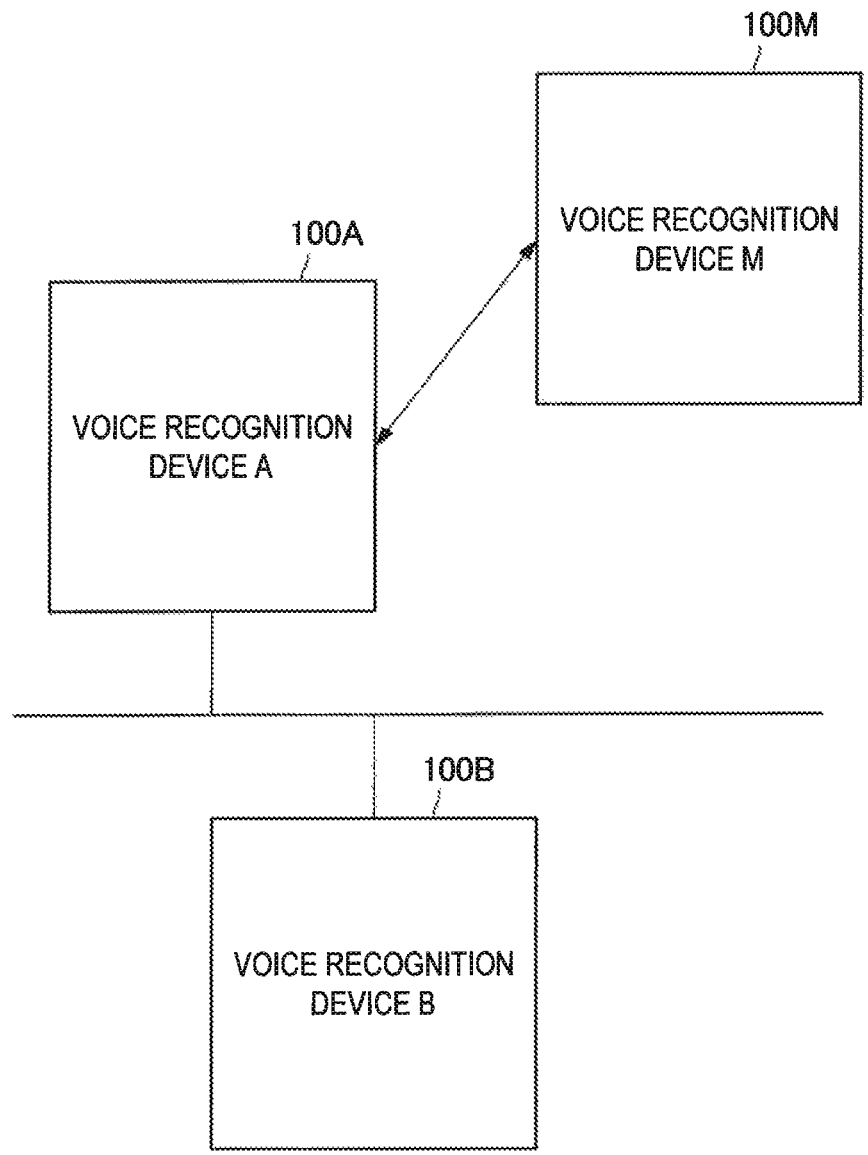

[Fig. 10]
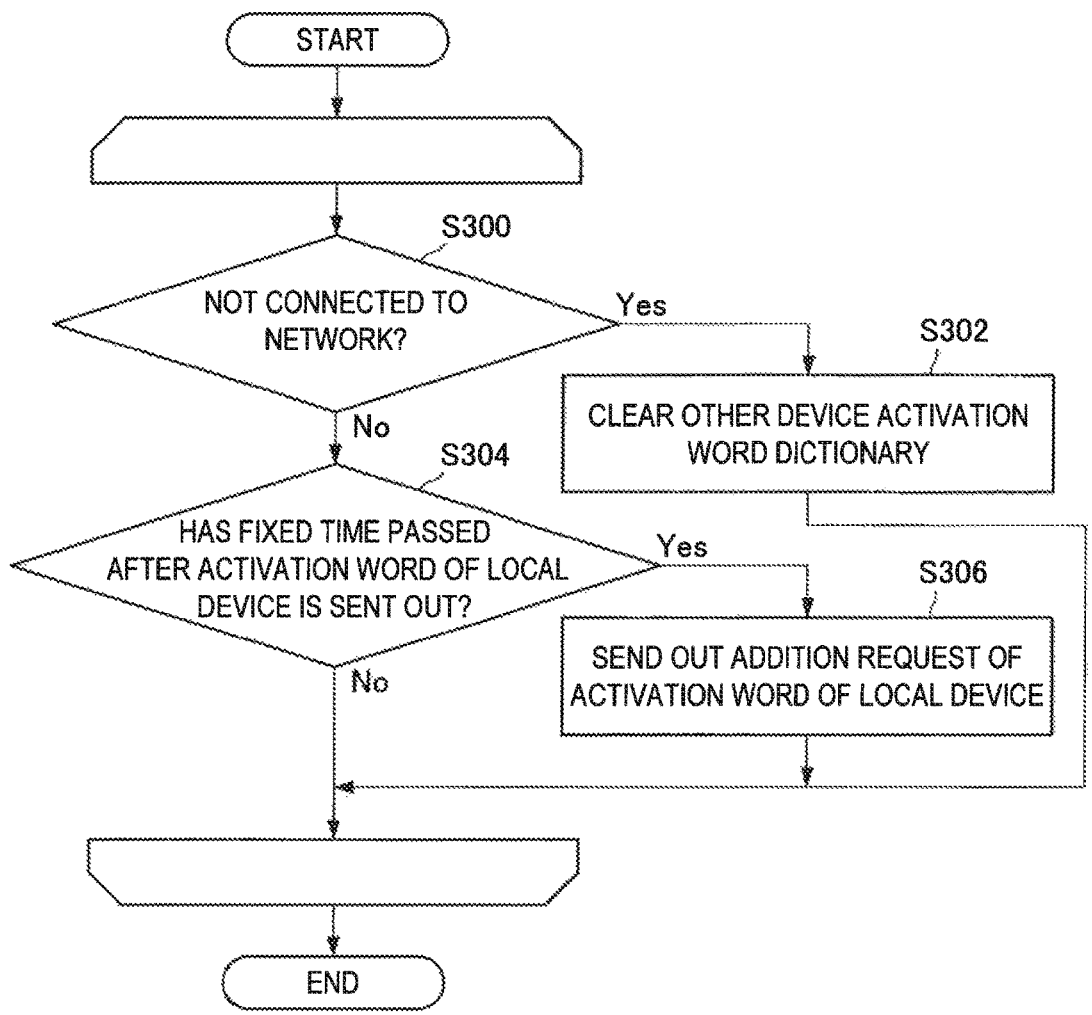

[Fig. 11]
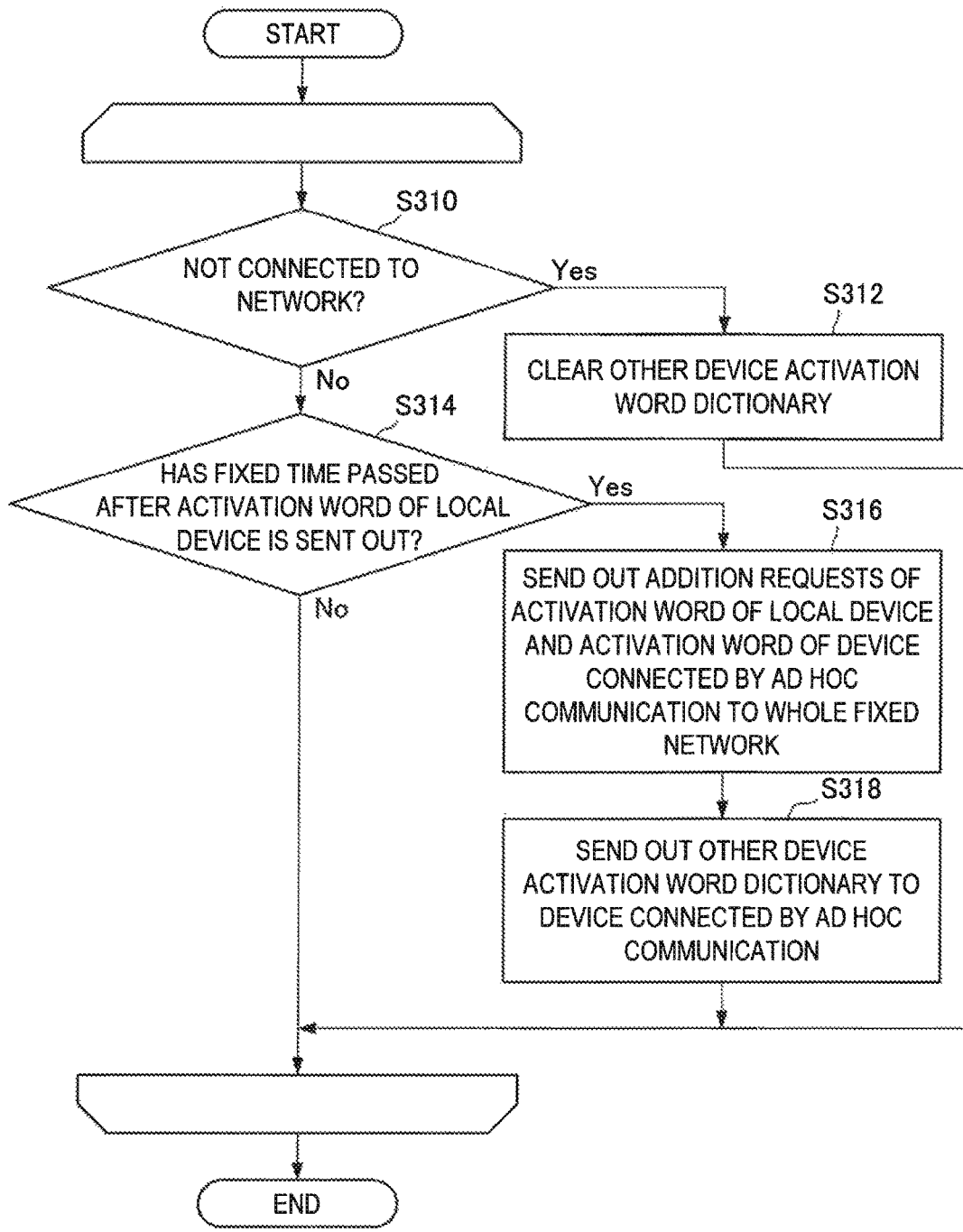

[Fig. 12]
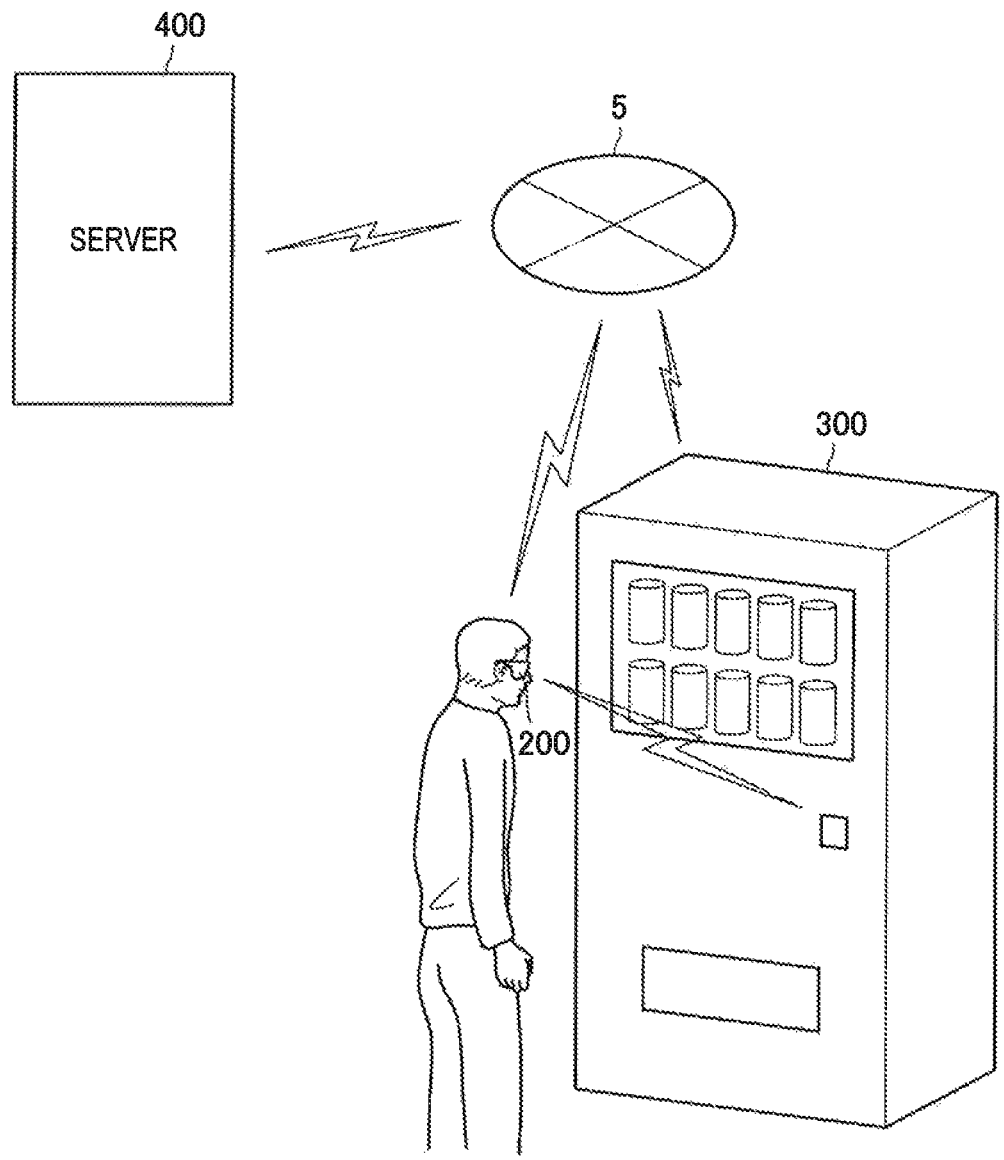

[Fig. 13]
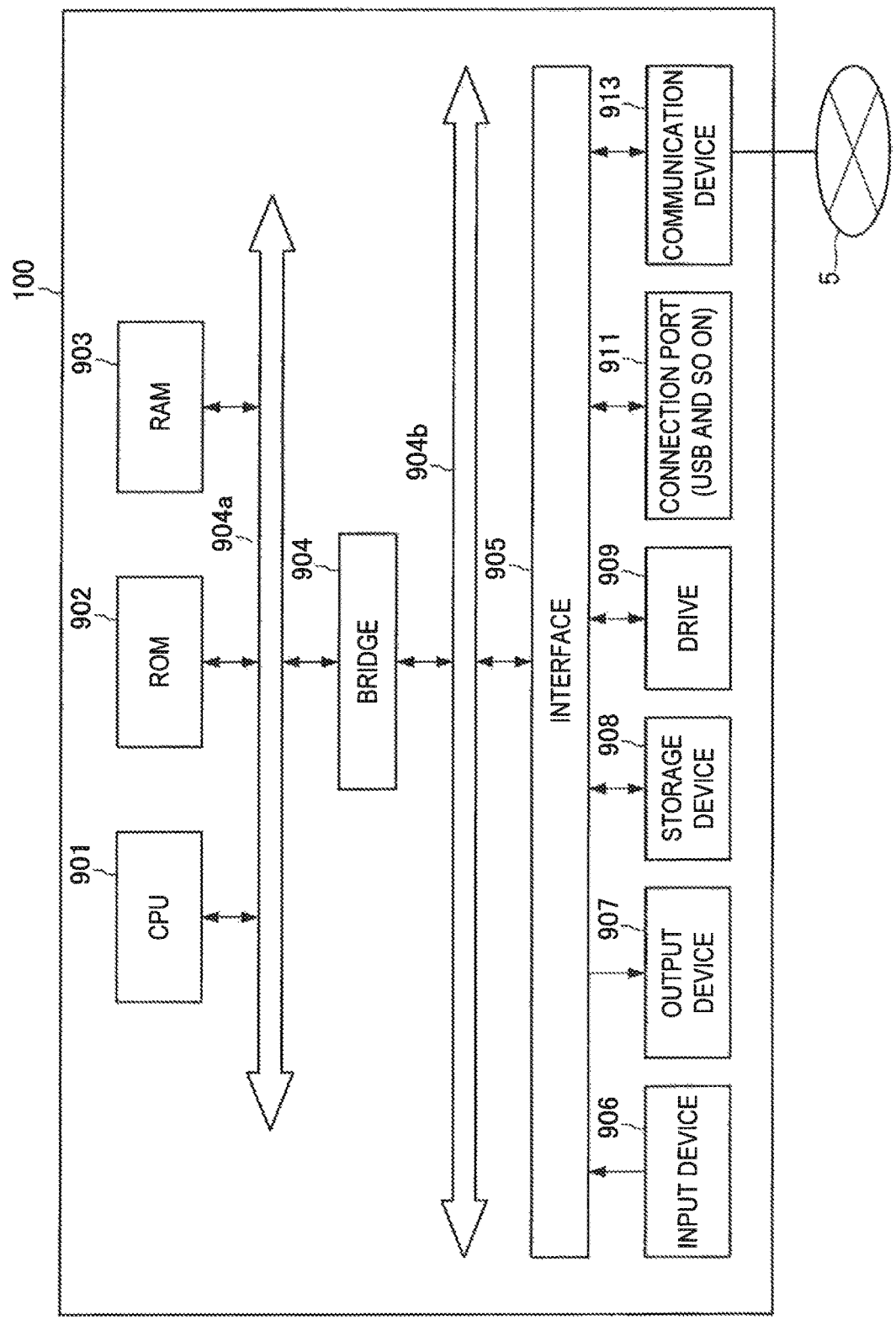

APPARATUS, METHOD, NON-TRANSITORY COMPUTER-READABLE MEDIUM AND SYSTEM FOR MODIFYING VOICE RECOGNITION INFORMATION

CROSS REFERENCE TO RELATED APPLICATIONS

This application claims the benefit of Japanese Priority Patent Application JP 2014-145795 filed Jul. 16, 2014, the entire contents of which are incorporated herein by reference.

TECHNICAL FIELD

The present disclosure relates to an information processing apparatus, an information processing method, and a program.

BACKGROUND ART

When a voice recognition function is used, the voice recognition function is normally stopped so that a voice recognition system should not erroneously react to a sound therearound and instructions to start voice recognition are generally given when the voice recognition function is used. For example, a method of using a push to talk switch and enabling voice recognition only while the switch is pushed is known. As a method that does not use a switch, for example, Patent Literature 1 discloses a method of recognizing voice only for a fixed period of time after a user utters a specific keyword. In addition to the above method, methods of enabling voice recognition by utterance include, for example, a method of enabling voice recognition for a fixed period of time by uttering a predetermined keyword and a method of enabling voice recognition of voice following after a predetermined keyword is uttered. Hereafter, enabling to acquire voice to be recognized when the voice recognition function is used will be called "activating voice recognition".

CITATION LIST

Patent Literature

PTL 1: JP 2006-215499 A
PTL 2: JP 2004-29354 A

SUMMARY

Technical Problem

The activation of voice recognition by voice can be expected to reduce, when compared with the switch operation, user's burdens. However, if a plurality of devices equipped with the voice recognition function is present around the user, as described above, the plurality of devices may react simultaneously when the voice recognition is activated.

Thus, a method of distinguishing these devices by giving different names (that is, keywords to activate the voice recognition) is known. For example, names of "John" and "Mike" are given to two devices to use these names as keywords to activate each of these devices. Accordingly, when the user utters "John", only the device named "John" will activate the voice recognition. However, if similar names are given to devices, devices other than the device whose voice recognition should be activated may erroneously be enabled to acquire voice.

With widespread use of mobile terminals and wearable terminals in recent years, an increased use of the voice recognition function is expected and therefore, it is desirable that the voice recognition function be usable by each device without causing any problem by preventing a malfunction of the voice recognition function.

Solution to Problem

According to an embodiment of the present disclosure, there is provided a first apparatus including a communication unit configured to transmit information permitting a second apparatus to modify stored voice recognition information based on a relationship between the first apparatus and the second apparatus.

According to another embodiment of the present disclosure, there is provided a method including transmitting information from a first apparatus to a second apparatus to permit the second apparatus to modify stored voice recognition information based on a relationship between the first apparatus and the second apparatus.

According to still another embodiment of the present disclosure, there is provided a non-transitory computer-readable medium having embodied thereon a program, which when executed by a processor of a first apparatus causes the first apparatus to perform a method, the method including transmitting information permitting a second apparatus to modify stored voice recognition information based on a relationship between the first apparatus and the second apparatus.

According to still another embodiment of the present disclosure, there is provided a system including a first apparatus and a second apparatus, wherein the first apparatus transmits information permitting the second apparatus to modify stored voice recognition information based on a relationship between the first apparatus and the second apparatus.

Advantageous Effects of Invention

According to one or more embodiments of the present disclosure, as described above, the voice recognition function can be used by each device without causing any problem by preventing a malfunction of the voice recognition function.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a conceptual diagram illustrating the exchange of dictionary information used for voice recognition between devices equipped with a voice recognition function.

FIG. 2 is an explanatory view showing a relationship between devices equipped with a voice recognition function according to a first embodiment of the present disclosure.

FIG. 3 is a function block diagram showing a function configuration of an information processing apparatus according to an embodiment.

FIG. 4 is an explanatory view showing a configuration example of another device activation word dictionary DB.

FIG. 5 is a flow chart showing a network monitoring process of the information processing apparatus according to an embodiment.

FIG. 6 is a flow chart showing a checking process of an activation word dictionary according to an embodiment.

FIG. 7 is a function block diagram showing the function configuration of an information processing apparatus according to a second embodiment of the present disclosure.

FIG. 8 is a flow chart showing an activation word recognition process by the information processing apparatus of a voice recognition device according to an embodiment.

FIG. 9 is an explanatory view showing the relationship between devices equipped with the voice recognition function according to a third embodiment of the present disclosure.

FIG. 10 is a flow chart showing an exchange process of an activation word by, among voice recognition devices according to an embodiment, devices connected to a fixed network or by ad hoc communication.

FIG. 11 is a flow chart showing the exchange process of the activation word by, among voice recognition devices according to an embodiment, devices connected to the fixed network and capable of performing ad hoc communication.

FIG. 12 is an explanatory view illustrating an information exchange process by voice recognition devices according to a fourth embodiment of the present disclosure.

FIG. 13 is a hardware configuration diagram showing an example of the hardware configuration of the voice recognition device in the present disclosure.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:

0. Overview
1. First Embodiment (Process When Similar Activation Words Are Present)
    1.1. Overview
    1.2. Function Configuration
    1.3. Process Flow
    1.4. Summary
2. Second Embodiment (Recognition Accuracy Improvement of Activation Word)
    2.1. Function Configuration
    2.2. Process Flow
3. Third Embodiment (Fixed Network and Ad Hoc Communication)
4. Fourth Embodiment (Exchange of Information about Voice Recognition Other Than Activation Word)
5. Hardware Configuration Example 0. Overview First, an overview of the function of an information processing apparatus according to an embodiment of the present disclosure will be provided based on FIG. 1. FIG. 1 is a conceptual diagram illustrating the exchange of dictionary information used for voice recognition between devices equipped with the voice recognition function.

Devices equipped with the voice recognition function store an activation word to activate voice recognition and words used for voice recognition as dictionary information. Based on the dictionary information, devices may be enabled to acquire voice to be recognized or may identify a thing or a process corresponding to a word uttered by the user. The information processing apparatus according to an embodiment of the present disclosure controls process content of voice recognition from the physical relationship between devices equipped with the voice recognition function. Accordingly, erroneous recognition of utterance content of other devices for voice recognition can be prevented and also the word set by the user for the voice recognition function is made available for other devices equipped with the voice recognition function.

Assume that, for example, as shown on the upper side of FIG. 1, devices A to D equipped with the voice recognition function are present and each of the devices A to D can acquire voice within respective ranges indicated by broken lines. If, in this case, the distances between devices are larger than respective predetermined distances, each of the devices A to D can use the voice recognition function without being affected by other devices. On the other hand, assume that, as shown on the lower side of FIG. 1, for example, the device A and the device B move closer to the device D and voice can mutually acquired between the device A and the device D and between the device B and the device D. In this case, a word uttered for one device can also be acquired by the other device and thus, the other device may malfunction.

Thus, an information processing apparatus according to an embodiment of the present disclosure exercises control not to perform an erroneous process by accepting dictionary information including words used for voice recognition from other devices when a plurality of devices equipped with the voice recognition function move closer to each other. If, for example, the same or similar word is also used by another device, the user may be warned and the voice recognition may be disabled while the device is within a close range. In addition, though the device A and the device B are not within the predetermined range, dictionary information of the other may be made acquirable via the device D. Accordingly, dictionary information of more devices can be acquired.

Such an information processing apparatus may be provided in each device or on a server. Hereinafter, the configuration of the information processing apparatus in each embodiment and processes thereby will be described.

1. First Embodiment

First, a control process of the voice recognition function by an information processing apparatus according to the first embodiment of the present disclosure will be described with reference to FIGS. 2 to 6. FIG. 2 is an explanatory view showing the relationship between devices equipped with the voice recognition function. FIG. 3 is a function block diagram showing a function configuration of an information processing apparatus according to an embodiment. FIG. 4 is an explanatory view showing a configuration example of another device activation word dictionary DB. FIG. 5 is a flow chart showing a network monitoring process of the information processing apparatus according to an embodiment. FIG. 6 is a flow chart showing a checking process of an activation word dictionary according to an embodiment.

(1.1. Overview)

In an embodiment, it is assumed that, as shown in FIG. 2, three voice recognition devices 100A, 100B, 100M are present as devices equipped with the voice recognition function. The voice recognition devices 100A, 100B, 100M are terminals that can be carried by the user like smartphones, glass type terminals, head-mounted displays, pendant type terminals, bracelet type terminals, and finger ring type terminals.

The voice recognition devices 100A, 100B, 100M send out an activation word that activates voice recognition. In addition, the voice recognition devices 100A, 100B, 100M can acquire the distance to other devices. Assume, for example, that Bluetooth (registered trademark) 4.0 is used for communication of the voice recognition devices 100A, 100B, 100M and information about the activation word is stored and transmitted by an advertise packet. If, for example, the information transmitted by the voice recognition device 100M is acquired by the voice recognition devices 100A, 100B, the voice recognition devices 100A, 100B can know the activation word of the voice recognition device 100M and the distance to the voice recognition device 100M.

In an embodiment, each of the voice recognition devices 100A, 100B. 100M includes an information processing apparatus that controls a process concerning voice recognition. The information processing apparatus of the voice recognition devices 100A, 100B, 100M controls the process concerning voice recognition based on the activation words received from other devices to activate voice recognition and the distance to such devices so that the voice recognition function is made available to each device without causing any problem.

(1.2. Function Configuration)

The voice recognition devices 100A, 100B, 100M include, as shown in FIG. 3, a communication unit 110, a control unit 120, a similarity determination unit 130, a microphone 140, an activation word recognition unit 150, an output unit 160, an activation word dictionary DB 170, and another device activation word dictionary DB 180. In FIG. 3, only functional units that function to perform a process related to recognition of the activation word in each of the voice recognition devices 100 (100A, 10B, 100M) are shown. The voice recognition device 100 may include other functional units than those shown in FIG. 3. An information processing apparatus according to an embodiment of the present disclosure includes, among functional units shown in FIG. 3, at least the control unit 120 and in an embodiment, the information processing apparatus is provided in the voice recognition device 100.

The communication unit 110 is a functional unit that transmits and receives information. The communication unit 110 can be configured by, for example, radio communication technology such as Bluetooth (registered trademark) 4.0. If Bluetooth (registered trademark) 4.0 is used, the distance to other communication objects can also be acquired. When another voice recognition device is positioned closer than a predetermined distance, the communication unit 110 exchanges information with the other voice recognition device.

The control unit 120 controls a process related to voice recognition of the voice recognition device. For example, the control unit 120 records the activation word of another voice recognition device acquired by the communication unit 110 in the other device activation word dictionary DB 180 or, after the acquisition of the activation word, causes the similarity determination unit 130 to determine the similarity thereof to activation words of other voice recognition devices. The control unit 120 controls the process related to voice recognition based on the similarity to the activation word of other voice recognition devices.

The similarity determination unit 130 determines the similarity of an activation word to activation words of other voice recognition devices. When an activation word is received from another voice recognition device, the similarity determination unit 130 calculates, under instructions of the control unit 120, similarities of the activation word to activation words of voice recognition devices within a predetermined range by referring to the activation word dictionary DB 170 and the other device activation word dictionary DB 180. If the calculated similarity is equal to a predetermined value or more, the similarity determination unit 130 determines that the activation words are similar or the same. A similarity determination result by the similarity determination unit 130 is output to the control unit 120.

The microphone 140 is a functional unit to acquire voice and acquires activation words of the voice recognition function uttered by users and voice to be recognized. The voice acquired by the microphone 140 is output to the activation word recognition unit 150.

The activation word recognition unit 150 recognizes whether any activation word is contained in voice acquired by the microphone 140. If recognized that an activation word is input by referring to the activation word dictionary DB 170, the activation word recognition unit 150 notifies the control unit 120 that the activation word is input.

The output unit 160 is a functional unit that outputs information and is, for example, a display that displays information or a speaker that outputs sound. The output unit 160 outputs a warning notified from the control unit 120 when, for example, the activation word is similar to an activation word of another voice recognition device within a predetermined range.

The activation word dictionary DB 170 is a storage unit that stores activation words that activate voice recognition. The activation word may be set by the user or preset by the device. Other voice recognition devices are notified of activation words stored in the activation word dictionary DB 170 via the communication unit 110.

The other device activation word dictionary DB 180 is a storage unit that stores activation words acquired from other voice recognition devices via the communication unit 110. The other device activation word dictionary DB 180 may store, for example, as shown in FIG. 4, the device name, identification information, and activation word of a voice recognition device together with the update date and time recorded in the other device activation word dictionary DB 180. The identification information may be information capable of uniquely identifying the device like, for example, the serial number. In the example in FIG. 4, the other device activation word dictionary DB 180 stores the presence of other voice recognition devices whose voice recognition is activated by the activation words of "Joey" and "Bobby". The activation word may be stored, as shown in FIG. 4, as a character string or phonetic symbols. The other device activation word dictionary DB 180 is updated in predetermined timing.

(1.3. Process Flow)

The control of a process related to voice recognition by an information processing apparatus of the voice recognition device 100 according to an embodiment will be described below. Hereinafter, the voice recognition device 100M is focused on and a case when the other voice recognition devices 100A, 100B are present will be described.

(1) Activation Word Monitoring Process

First, a monitoring process of the activation word to activate voice recognition will be described based on FIG. 5. The voice recognition device 100M is normally prevented from accepting voice to be recognized and the voice recognition is activated by inputting the activation word. If the other voice recognition devices 100A, 100B are present within a predetermined range, the voice recognition device 100M receives respective activation words of these devices to determine whether the activation words are the same or similar to the activation word thereof.

As shown in FIG. 5, the voice recognition device 100M determines whether any other voice recognition device is detected (S100). While no other voice recognition device is detected, the process in step S100 is repeated. When another voice recognition device is detected, the voice recognition device 100M determines whether the other detected voice recognition device is present within the predetermined range (S102).

As the distance to the other voice recognition device, for example, distance information contained in communication information of Bluetooth (registered trademark) 4.0 or the like or a physical distance acquired from position information by GPS (Global Positioning System) or the like can be used. Alternatively, the voice recognition device 100M may estimate the presence of another voice recognition device within a predetermined range based on communication radio field intensity between devices, the magnitude of a sound wave output from each device or voice acquired by the microphone 140, or closeness of voice content. Also, the voice recognition device 100M may recognize the positions of other voice recognition devices by acquiring beacon information.

If it is determined in step S102 that another voice recognition device is present in the predetermined range, the voice recognition device 100M accepts the activation word sent out by the other voice recognition device (S104). On the other hand, if no voice recognition device is present in the predetermined range, no activation word is accepted. Then, the voice recognition device 100M checks whether, among activation words stored in the other device activation word dictionary DB 180, there is any old activation word that is not updated for a fixed period of time (S106). If there is such an old activation word, the voice recognition device 100M deletes the applicable activation word from the other device activation word dictionary DB 180 (S108).

After information stored in the other device activation word dictionary DB 180 is updated in steps S104, S108, the process starting with step S100 is repeated. Also when it is determined in step S108 that there is no old activation word, the process in FIG. 5 is repeated while the voice recognition device 100M is active by returning to the process in step S100.

(2) Similarity Determination Process

On the other hand, while the voice recognition device 100M is active, the voice recognition device 100M performs a similarity determination process that determines the similarity between the activation word of the voice recognition device 100M and the activation word of another voice recognition device. The similarity determination process is the process shown in FIG. 6 and the similarity is determined when the activation word of the voice recognition device 100M is changed or the activation word of another voice recognition device is added or corrected and the other device activation word dictionary DB 180 is updated. For example, when the process in step S104 in FIG. 5 is performed, the similarity is determined.

In the similarity determination process, as shown in FIG. 6, first whether the activation word of the voice recognition device 100M is changed is determined (S110). If, the example, the activation word is changed by the user, the process proceeds to step S114 to determine the similarity. On the other hand, if the activation word of the voice recognition device 100M is not changed, whether the activation word of another voice recognition device is added or corrected and the other device activation word dictionary DB 180 is updated is determined (S112). If the other device activation word dictionary DB 180 is not updated, the process starting with step S110 in FIG. 6 is repeated.

On the other hand, if the other device activation word dictionary DB 180 is updated, the similarity is calculated by the similarity determination unit 130 by comparing the activation word of the voice recognition device 100M and the activation word of the other voice recognition device (S14). The similarity between activation words is calculated by using a publicly known technology. For example, the activation word may be converted into a phonetic symbol string to represent the similarity based on an edit distance between phonetic symbols. For example, concerning the activation words of "Joe" and "Joey", the phonetic symbol of "Joe" is "jo:" and the phonetic symbol of "Joey" is "jo:i" and if "i" at the end is deleted, the pronunciation is the same as that of "Joe" and thus, the edit distance of 1 is obtained. When the edit distance is equal to a predetermined value or less, activation words may be considered to be similar or the same. Alternatively, as described in Patent Literature 2, the similarity may be calculated by using an acoustic characteristic quantity.

When, in step S114, the similarity between activation words is calculated, the similarity determination unit 130 determines whether these are the same or similar (S116). Then, if it is determined in step S116 that another voice recognition device of the activation word that is the same or similar to the activation word of the voice recognition device 100M, the control unit 120 issues a warning to the user via the output unit 160 (S118).

Assume, for example, that the activation word of the voice recognition device 100M is "Joe" and another voice recognition device "Smartphone01" having the activation word of "Joey" as shown in FIG. 4 is present. In this case, the control unit 120 outputs a warning like "Device "Smartphone01" nearby is named "Joey"" to the output unit 160. The user having received such a warning can recognize that there is the possibility of voice recognition of the voice recognition device 100M being activated by another user uttering "Joey".

In an embodiment, a warning is issued to the user by displaying a message, but the present disclosure is not limited to such an example. For example, a warning may be issued to the user by a sound or vibration. Alternatively, a warning may be issued to the user via another terminal other than the voice recognition device. For example, if the voice recognition device 100M is a bracelet type terminal, a warning may be issued from the smartphone held by the user through a message, a sound, or vibration.

At this point, the control unit 120 of the voice recognition device 100M may perform a predetermined process so that voice recognition is not activated without being intended by the user. For example, while a warning is issued, the control unit 120 may stop the voice recognition function of the voice recognition device 100M and even if the activation word of the voice recognition device 100M is uttered, the voice recognition may be prevented from functioning. Alternatively, when a warning is issued based on a registration or correction of the activation word of another voice recognition device, the control unit 120 may prompt a temporary change of the activation word of the voice recognition device 100M while the warning is issued. In this case, an activation word that is not the same or similar to the activation word of the other voice recognition device may be presented by the control unit 120 so that the presented activation word is temporarily used.

When a warning is issued due to the change of the activation word of the voice recognition device 100M, the control unit 120 may prompt registration of another activation word without accepting the change of the activation word of the voice recognition device 100M. In this manner, when another voice recognition device to which the same or similar activation word is set is present within a predetermined range of the voice recognition device 100M, the voice recognition can be prevented from being activated without being intended by the user by a predetermined process being performed by the control unit 120.

Then, the control unit 120 determines whether the other voice recognition device is now positioned outside the predetermined range of the voice recognition device 100M (S120). While the other voice recognition device to which the same or similar activation word is set is within the predetermined range of the voice recognition device 100M, the warning in step S118 continues to be issued. Then, when the other voice recognition device is positioned outside the predetermined range of the voice recognition device 100M, the control unit 120 terminates the issuance of the warning (S122). Accordingly, the user can recognize that the possibility of voice recognition being activated by utterance of another user is eliminated. At this point, if there is any predetermined process performed by the control unit 120 when a warning is output, the process is also terminated. The process in FIG. 6 is repeated while the voice recognition device 100M is active.

(1.4. Summary)

In the foregoing, the process related to activation of voice recognition in a voice recognition device according to the first embodiment of the present disclosure has been described. According to an embodiment, when another voice recognition device is present within a predetermined range of the voice recognition device 100M, the similarity of activation words that activate the voice recognition is determined. When the activation words are determined to be the same or similar, there is the possibility of the voice recognition of the voice recognition device 100M being unintentionally activated and therefore, a warning is issued to the user of the voice recognition device 100M. Accordingly, the user can be prompted to be careful. Further, when a warning is issued to the user, the control unit 120 may perform a predetermined process so that the voice recognition of the voice recognition device 100M is not unintentionally activated. Therefore, by including an information processing apparatus according to an embodiment of the present disclosure in a voice recognition device, a malfunction during voice recognition can be suppressed.

2. Second Embodiment

Next, a voice recognition device including an information processing apparatus according to the second embodiment of the present disclosure will be described based on FIGS. 7 and 8. The information processing apparatus of the voice recognition device according to an embodiment is different from the first embodiment in that the activation word recognition unit 150 refers to, in addition to the activation word dictionary DB 170, the other device activation word dictionary DB 180. Accordingly, recognition performance of the activation word recognition unit 150 can be improved.

(2.1. Function Configuration)

FIG. 7 shows the function configuration of the voice recognition device 100 according to an embodiment. As shown in FIG. 7, the voice recognition device 100 includes the communication unit 110, the control unit 120, the similarity determination unit 130, the microphone 140, the activation word recognition unit 150, the output unit 160, the activation word dictionary DB 170, and the other device activation word dictionary DB 180. The above configuration is the same as the function configuration of the voice recognition device 100 according to the first embodiment shown in FIG. 3. Therefore, a detailed description of each functional unit here is omitted.

The difference from the first embodiment is that the activation word recognition unit 150 also refers to the other device activation word dictionary DB 180. The activation word recognition unit 150 in an embodiment determines how close is the activation word of the voice recognition device 100M to activation words stored in the other device activation word dictionary DB 180. Accordingly, recognition errors of the activation word are reduced.

Assume, for example, that the activation word of "Joe" is set to the voice recognition device 100M. The activation word of "Joe" is stored in the activation word dictionary DB 170. On the other hand, it is assumed that the presence of the device whose activation word is "Joey" is stored in the other device activation word dictionary DB 180. If the user of the voice recognition device 100M utters "Joe", the activation word recognition unit 150 determines whether the input voice is the same or similar to the set activation word by referring to the activation word dictionary DB 170. Further, the activation word recognition unit 150 calculates how close the input voice to activation words of other voice recognition devices by referring to the other device activation word dictionary DB 180.

Then, the activation word recognition unit 150 determines to which of the activation word of the voice recognition device 100M and activation words of other voice recognition devices the input voice is closer. It is determined that the input voice is closer to the activation voice of another voice recognition device, the activation word recognition unit 150 determines that the input voice is likely not to be the activation word of the voice recognition device 100M and the input of the activation word is canceled. Accordingly, recognition errors of the activation word are reduced.

(2.2. Process Flow)

An activation word recognition process by an information processing apparatus of the voice recognition device 100 according to an embodiment will be described below. Also in an embodiment, like in the first embodiment, the voice recognition device 100M is focused on and a case when the other voice recognition devices 100A, 100B are present will be described.

The activation word recognition unit 150 monitors to check whether the microphone 140 has acquired voice (S200). The activation word recognition unit 150 repeats the process in step S200 until voice is acquired. Then, when voice is acquired, the activation word recognition unit 150 matches the input voice to the activation word of the voice recognition device 100M stored in the activation word dictionary DB 170 to determine whether the input voice is the activation word to activate voice recognition (S202). The result of matching is represented as a similarity to the activation word.

Then, the activation word recognition unit 150 determines whether the input voice is close to the activation word of the voice recognition device 100M (S204). That is, the activation word recognition unit 150 determines whether the similarity of the input voice to the activation word of the voice recognition device 100M is equal to a predetermined value or more. If the similarity is smaller than the predetermined value, the input voice is determined not to be the activation word of the voice recognition device 100M and the process starting with step S200 is repeated. On the other hand, if the similarity is equal to the predetermined value or more, the activation word recognition unit 150 further matches the input voice to the activation word of another voice recognition device stored in the other device activation word dictionary DB 180 (S206). In step S206, the similarity between the input voice and the activation word of another voice recognition device is calculated. When activation words of a plurality of voice recognition devices are entered in the other device activation word dictionary DB 180, the similarity is calculated for each.

Then, the activation word recognition unit 150 determines whether the input voice is the closest to the activation word of the voice recognition device 100M rather than activation words of other voice recognition devices (S208). In step S208, the activation word recognition unit 150 makes sure that the similarity to the voice recognition device 100M calculated in step S202 is larger than the similarity to the activation word to the other voice recognition device calculated in step S206. If the input voice is determined to be the closest to the activation word of the voice recognition device 100M, the activation word recognition unit 150 notifies the control unit 120 that the activation word has been input to cause the control unit to activate voice recognition (S210). On the other hand, if the input voice is closer to the activation word of the other voice recognition device, the input voice is considered not to be the activation word and the process starting with step S200 is repeated. The process in FIG. 8 is repeated while the voice recognition device 100M is active.

In the foregoing, the process to recognize the activation word of the voice recognition function according to the second embodiment of the present disclosure has been described. According to an embodiment, when voice is acquired by the microphone 140, in addition to determining whether the input voice is the activation word of the voice recognition device 100M, the input voice is determined to be closer to the activation word of the voice recognition device 100M than activation words of other voice recognition devices Accordingly, recognition errors of the activation word can be reduced.

In an embodiment, the calculation of similarity of the input voice to the activation word of the voice recognition device 100M and the calculation of similarity of the input voice to activation words of other voice recognition devices are done separately, but the present disclosure is not limited to such an example. For example, similarities of the input voice to the activation words of the voice recognition device 100M and other voice recognition devices may be calculated to determine whether to activate voice recognition based on whether the activation word of the largest similarity is that of the voice recognition device 100M.

3. Third Embodiment

Next, a voice recognition device including an information processing apparatus according to the third embodiment of the present disclosure will be described based on FIGS. 9 to 11. In an embodiment, as shown in FIG. 9, a case when one or a plurality of voice recognition devices 100A, 100B connected to a network is present and the voice recognition device 100M connected to the voice recognition device 100A of these recognition devices in ad hoc mode is present is considered. The ad hoc communication can be performed based on the standard of Wi-Fi (registered trademark), Bluetooth (registered trademark), or ZigBee (registered trademark).

In an embodiment, when connected to the voice recognition device 100A via ad hoc communication, the voice recognition device 100M can also acquire the activation word of the voice recognition device 100B in a network to which the voice recognition device 100A is connected via the voice recognition device 100A. In addition, the activation word of the voice recognition device 100M is sent out to the voice recognition device 100B via the voice recognition device 100A. That is, the voice recognition device 100A connected to a fixed network and accepting connection of ad hoc communication acts as a gateway to send out the activation word of each voice recognition device to other voice recognition devices via ad hoc communication and the fixed network.

In an embodiment, therefore, respective activation words are shared among the voice recognition devices 100A, 100B, 100M by simply connecting the voice recognition device 100A and the voice recognition device 100M. Similarly, activation words can be shared when voice recognition devices in a network are increased or voice recognition devices connected by an ad hoc network are increased.

The function configuration of the voice recognition device 100 according to an embodiment may be the same as the function configuration in the first embodiment shown in FIG. 3 or the same as the function configuration in the second embodiment shown in FIG. 7. Therefore, the description of the function configuration of the voice recognition device 100 here is omitted. Incidentally, the communication unit 110 is implemented based on Ethernet (registered trademark), Wi-Fi (registered trademark), Bluetooth (registered trademark) 4.0 or the like.

An exchange process of an activation word by the voice recognition device 100 according to an embodiment will be described based on FIGS. 10 and 11. FIG. 10 is a flow chart showing an exchange process of an activation word by, among voice recognition devices according to an embodiment, devices connected to a fixed network or by ad hoc communication (that is, the voice recognition devices 100B, 100M in FIG. 9). FIG. 11 is a flow chart showing the exchange process of the activation word by, among voice recognition devices according to an embodiment, devices connected to the fixed network and capable of performing ad hoc communication (that is, the voice recognition device 100A in FIG. 9).

(1) Exchange Process of the Activation Word by the Voice Recognition Devices 100B, 100M First, to describe the exchange process of the activation word by the voice recognition devices 100B, 100M, as shown in FIG. 10, the voice recognition devices 100B, 100M first determine whether or not connected to a network (S300). If not connected to a network, information in the other device activation word dictionary DB 180 is cleared (S302) and the process starting with step S300 is repeated. On the other hand, if connected to a network, whether a fixed time has passed after the activation word is sent out (S304) and the process starting with step S300 is repeated until the fixed time passes.

If it is determined in step S304 that the fixed time has passed after the activation word is sent out, the control unit 120 sends out the addition of the activation words of the voice recognition devices 100B, 100M to the other voice recognition devices via the communication unit 110 (S306).

Accordingly, for example, the voice recognition device 100A connected to the fixed network receives an addition request of the activation word of the voice recognition device 100B and the activation word of the voice recognition device 100B is recorded in the other device activation word dictionary DB 180 of the voice recognition device 100A. Also, the voice recognition device 100A connected by ad hoc communication receives an addition request of the activation word of the voice recognition device 100M and the activation word of the voice recognition device 100M is recorded in the other device activation word dictionary DB 180 of the voice recognition device 100A.

The exchange process of the activation word shown in FIG. 10 is repeated while the voice recognition devices 100B, 100M are active.

(2) Exchange Process of the Activation Word by the Voice Recognition Device 100A Next, the exchange process of the activation word by the voice recognition device 100A will be described. Also in this case, as shown in FIG. 11, first the voice recognition device 100A determines whether or not connected to a network (S310). If not connected to a network, information in the other device activation word dictionary DB 180 is cleared (S312) and the process starting with step S310 is repeated. On the other hand, if connected to a network, whether a fixed time has passed after the activation word is sent out (S314) and the process starting with step S310 is repeated until the fixed time passes.

If it is determined that the fixed time has passed after the activation word is sent out, the control unit 120 sends out the addition of the activation words of the voice recognition device 100A and the voice recognition device 100M connected by ad hoc communication to the fixed network via the communication unit 110 (S316). Accordingly, the voice recognition device 100B connected to the fixed network receives the activation words of the voice recognition devices 100A, 100M and the activation words are recorded in the other device activation word dictionary DB 180 of the voice recognition device 100B. Also, the control unit 120 sends out information recorded in the activation word dictionary DB 170 and the other device activation word dictionary DB 180 of the voice recognition device 100A to the voice recognition device 100M connected by ad hoc communication via the communication unit 110 (S318). In this case, the information sent out to the voice recognition device 100M does not contain the activation word of the voice recognition device 100M as the destination of the information. The voice recognition device 100M records the information received from the voice recognition device 100A in the other device activation word dictionary DB 180 of the voice recognition device 100M.

The exchange process of the activation word shown in FIG. 11 is also repeated while the voice recognition devices 100A is active.

In the foregoing, the exchange process of the activation word between voice recognition devices according to an embodiment has been described. According to an embodiment, when the voice recognition device 100M and the voice recognition devices 100A, 100B connected by a fixed network are present, if the voice recognition devices 100A, 100M are connected by ad hoc communication, the voice recognition device 100A sends information including information of the voice recognition device 100B to the voice recognition device 100M. That is, the voice recognition device 100A sends and receives information as an intermediary of the voice recognition devices 100B, 100M.

When the ad hoc communication is connected by, for example, Bluetooth (registered trademark) 4.0 capable of rough calculation, information about voice recognition may be exchanged in accordance with the distance between devices. For example, the information may be exchanged only when the distance between the voice recognition devices 100A, 100M is equal to a predetermined distance or less and is determined to be "close". Accordingly, information is exchanged only when information about voice recognition becomes necessary.

It is also assumed that, for example, in addition to the voice recognition devices 100A, 100B, a voice recognition device 100C is connected to the fixed network shown in FIG. 9. The voice recognition devices 100A, 100B and the voice recognition device 100C are physically separated. For example, the voice recognition devices 100A, 100B are located in the first floor of a building and the voice recognition device 100C is located in the second floor of the building. In this case, the voice recognition devices 100A, 100B may be set as a first group and the voice recognition device 100C as a second group so that only information about voice recognition of the voice recognition devices of the same group is sent to other devices connected by communication.

It is assumed, for example, that the voice recognition device 100A and the voice recognition device 100M are connected by ad hoc communication. In this case, the voice recognition device 100A sends information by including information about the voice recognition device 100B belonging to the same group to the voice recognition device 100M, but does not send out information about the voice recognition device 100C belonging to a different group. Information about voice recognition of the voice recognition device 100C is exchanged when, for example, the voice recognition devices 100C, 100M are connected by ad hoc communication.

Further, a beacon may be installed in the space for measure the distance between voice recognition devices. For example, a beacon X and the voice recognition devices 100A, 100B are associated as a group in advance and when the distance between the voice recognition device 100M and the beacon X is equal to a predetermined distance or less, the voice recognition device 100M acquires and utilizes voice recognition information of the voice recognition devices 100A, 100B. In this case, information may be exchanged between the voice recognition device 100M and the voice recognition devices 100A, 100B by ad hoc communication between the voice recognition device 100M and the voice recognition device 100A or the voice recognition device 100B. Alternatively, information may be exchanged by sending notification of the location on the Internet where information about voice recognition is present.

4. Fourth Embodiment

Next, an information exchange process between voice recognition devices according to the fourth embodiment of the present disclosure will be described based on FIG. 12. In embodiments, a case when the activation words are exchanged between the voice recognition devices 100 has been described, but information about voice recognition to be exchanged may be other than the activation word and may be, for example, word information set for each user and identifiable by voice recognition (hereinafter, referred to also as a "user dictionary").

As an example, a case when, as shown in FIG. 12, a user purchases a beverage from a vending machine 300 will be considered. The vending machine 300 is equipped with the voice recognition function and a beverage can be selected and purchased by, for example, the name of the desired beverage being uttered by the user. Also, the user wears a glass type terminal 200 equipped with the voice recognition function. The glass type terminal 200 and the vending machine 300 can communicate via ad hoc communication or a network 5.

It is assumed here that the user is positioned within a predetermined range of the vending machine 300 (for example, the range within 1 m from the front side of the vending machine 300). In this case, the vending machine 300 can acquire the user dictionary of the user from the glass type terminal 200 worn by the user. With the user dictionary being acquired by the vending machine 300, the user can purchase goods from the vending machine 300 using words identified by voice recognition set individually by the user. If, for example, "Ocha (tea)" is associated with the word "Ryokucha (green tea)" in the user dictionary, when the user utters "Ocha", the vending machine 300 selects the green tea by referring to the user dictionary.

When the user purchases a beverage and moves away from the vending machine 300 out of the predetermined range of the vending machine 300, the vending machine 300 deletes the user dictionary of the user. Alternatively, the vending machine 300 may delete the user dictionary of the user when a predetermined time passes after the user purchases a beverage. Accordingly, the vending machine 300 can temporarily acquire the user dictionary and delete the dictionary when the dictionary becomes unnecessary.

In the above case, an example in which a user dictionary is provided from the glass type terminal 200 worn by the user to the vending machine 300 and user's input voice is matched to the corresponding goods by the vending machine 300 is described, but the present technology is not limited to such an example. For example, when the user is positioned within the predetermined range of the vending machine 300, the glass type terminal 200 may acquire goods information from the vending machine 300. In this case, user's input voice is matched to the corresponding goods by the glass type terminal 200 and the glass type terminal 200 notifies the vending machine 300 of the goods intended by the user based on a matching result. After receiving the notification, the vending machine 300 selects the notified goods. In this case, the vending machine 300 does not need to be equipped with the voice recognition function and only has to be able to send and receive information to and from the glass type terminal 200.

Alternatively, when a server 400 connected via the network 5 holds a user dictionary, the vending machine 300 may acquire the user dictionary from the server 400 to match user's input voice to the user dictionary. For example, the vending machine 300 acquires the user ID of the user positioned within the predetermined range via the glass type terminal 200 worn by the user or the like and notifies the server 400 of the user ID via the network 5. The server 400 sends the user dictionary corresponding to the user ID to the vending machine 300. The vending machine 300 having acquired the user dictionary can identify the corresponding goods based on the user dictionary after receiving user's input voice. Incidentally, matching of the user's input voice to the corresponding goods may be done on the side of the server 400.

In addition to the vending machine 300, such an information exchange process can be used when, for example, telephone directory information is temporarily provided in the public telephone.

In the foregoing, the information exchange process between voice recognition devices according to the fourth embodiment of the present disclosure has been described. According to an embodiment, by exchanging voice recognizable word information other than the activation word that activates voice recognition based on the physical relationship between voice recognition devices, settings for each user can temporarily be made available to other devices. Accordingly, the user can use the voice recognition function of any device in the same manner, enhancing the convenience of the user. In addition, the path of information exchange formed by devices being brought closer to each other disappears and information is also deleted when the devices move away from each other. Therefore, information that is no longer used will not be continued to be accumulated.

When the voice recognition device is a wearable terminal, user-specific parameters of voice recognition may be set. In such a case, by communicating voice recognition parameters held by the wearable terminal like an activation word or a user dictionary over the network, recognition performance of fixed words of peripheral devices connected to a fixed network can further be improved. For example, attribute information of the user such as the sex and age of the owner of a voice recognition device may be sent.

5. Hardware Configuration Example

Lastly, a hardware configuration example of the voice recognition device 100 according to embodiments will be described. FIG. 13 is a hardware configuration diagram showing a hardware configuration of the voice recognition device 100 according to embodiments.

The voice recognition device 100 can be implemented by a processing apparatus such as a computer, as described above. As illustrated in FIG. 13, the voice recognition device 100 includes a central processing unit (CPU) 901, a read only memory (ROM) 902, a random access memory (RAM) 903, and a host bus 904a. The voice recognition device 100 also includes a bridge 904, an external bus 904b, an interface 905, an input device 906, an output device 907, a storage device (hard disk drive) 908, a drive 909, a connection port 911, and a communication device 913.

The CPU 901 functions as an arithmetic processing unit and a control unit, and controls overall operation of the voice recognition device 100 according to a variety of programs. The CPU 901 may also be a microprocessor. The ROM 902 stores therein the programs, operational parameters, and the like that are used by the CPU 901. The RAM 903 temporarily stores therein the programs used and executed by the CPU 901, parameters appropriately varying in executing the programs, and the like. These are connected to each other through the host bus 904a configured of a CPU bus or the like.

The host bus 904a is connected to the external bus 904b such as a peripheral component interconnect/interface (PCI) bus through the bridge 904. Note that the host bus 904a, the bridge 904, and the external bus 904b do not have to be configured separately, and functions of these may be implemented by a single bus.

The input device 906 includes: an input unit for inputting information by a user, such as a mouse, a keyboard, a touch panel, buttons, a microphone, a switch, or a lever, an input control circuit generating input signals based on input by the user and outputting the signals to the CPU 901; and the like. The output device 907 includes: a display device such as a liquid crystal display (LCD) device, an organic light emitting diode (OLED) device, or a lamp; and an audio output device such as a speaker.

The storage device 908 is an example of a storage unit of the voice recognition device 100 and is a device for storing data. The storage device 908 may include a storage medium, a recorder that records data in the storage medium, a reader that reads data from the storage medium, a deletion device that deletes data recorded in the storage medium, and the like. The storage device 908 drives a hard disk and stores programs executed by the CPU 901 and a variety of data.

The drive 909 is a reader/writer and is built in or externally connected to the voice recognition device 100. The drive 909 reads information recorded in the removable recording medium loaded in the drive 909 such as a magnetic disk, an optical disk, a magneto-optical disk, or a semiconductor memory, and outputs the information to the RAM 903.

The connection port 911 is an interface connected to an external device, and is a port of connection with the external device capable of transferring data through, for example, a universal serial bus (USB). The communication device 913 is a communication interface configured of a communication device or the like for connecting to, for example, the communication network 5. The communication device 913 may be a communication device supporting a wireless local area network (LAN), a communication device supporting a wireless USB, or a wired communication device that performs wired communication.

It should be understood by those skilled in the art that various modifications, combinations, sub-combinations and alterations may occur depending on design requirements and other factors insofar as they are within the scope of the appended claims or the equivalents thereof.

In embodiments, for example, the voice recognition device is, for example, a smartphone, a glass type terminal, a head-mounted display, a pendant type terminal, a bracelet type terminal, or a finger ring type terminal, but the present technology is not limited to such examples. For example, the voice recognition device may be, for example, a TV set, a game machine, a microwave oven, an audio device, a lighting apparatus, a speaker, a tablet terminal, a personal computer, an automobile, an on-vehicle device, or medical equipment such as an endoscope.

In addition, the effects described in the present specification are merely illustrative and demonstrative, and not limitative. In other words, the technology according to the present disclosure can exhibit other effects that are evident to those skilled in the art along with or instead of the effects based on the present specification.

(1)
A first apparatus including:
a communication unit configured to transmit information permitting a second apparatus to modify stored voice recognition information based on a relationship between the first apparatus and the second apparatus.

(2)
The first apparatus according to (1), wherein the communication unit is configured to provide or authorize, for receipt at the second apparatus, first voice recognition information as the transmitted information based on the relationship between the first apparatus and the second apparatus.

(3)
The first apparatus according to (1) or (2), wherein the relationship between the first apparatus and the second apparatus is a change in distance between the first apparatus and the second apparatus.

(4)
The first apparatus according to any one of (1) to (3), wherein the relationship between the first apparatus and the second apparatus is a lapse in time after communication between the first apparatus and the second apparatus.

(5)
The first apparatus according to any one of (1) to (4), wherein the relationship between the first apparatus and the second apparatus is a change in communication radio field intensity between the first apparatus and the second apparatus.

(6)
The first apparatus according to any one of (1) to (5), wherein the voice recognition information includes at least one voice activation word.

(7)
The first apparatus according to any one of (1) to (6), wherein the voice recognition information is a user specific dictionary associated with the first device including the at least one voice activation word or at least one voice recognition word which is not a voice activation word.

(8)
The first apparatus according to any one of (1) to (7), wherein the stored voice recognition information of the second apparatus includes second voice recognition information associated with the second device.

(9)
The first apparatus according to any one of (1) to (8), wherein the second apparatus modifies the stored voice recognition information based on the relationship between the first apparatus and the second apparatus by updating the stored voice recognition information to include the first voice recognition information.

(10)
The first apparatus according to any one of (1) to (8), wherein the second apparatus modifies the stored voice recognition information based on the relationship between the first apparatus and the second apparatus by updating the second voice recognition information to include the first voice recognition information.

(11)
The first apparatus according to any one of (1) to (10), wherein the second apparatus modifies the first voice recognition information based on the relationship between the first apparatus and the second apparatus by updating the stored voice recognition information to remove the first voice recognition information from the stored voice recognition information.

(12)
The first apparatus according to any one of (1) to (11), wherein the second apparatus compares the first voice recognition information with the second voice recognition information.

(13)
The first apparatus according to any one of (1) to (12), wherein at least one of the first apparatus or the second apparatus inactivates voice recognition functions when the first voice recognition information is the same or similar to the second voice recognition information.

(14)
The first apparatus according to any one of (1) to (13), wherein the first voice recognition information and the second voice recognition information is the same or similar based on phonetic symbol string analysis.

(15)
The first apparatus according to any one of (1) to (14), wherein at least one of the first apparatus or the second apparatus issues a warning of potential voice recognition conflict if the first voice recognition information and the second voice recognition information is the same or similar.

(16)

The first apparatus according to any one of (1) to (15), wherein the first voice recognition information and the second voice recognition information is the same or similar based on phonetic symbol string analysis.

(17)

The first apparatus according to any one of (1) to (16), wherein the second apparatus receives the first voice recognition information from a server.

(18)

The first apparatus according to any one of (1) to (17), wherein the second apparatus receives the first voice recognition information from the server based on the second apparatus receiving identification information of the first apparatus from the first apparatus.

(19)

A method including:

transmitting information from a first apparatus to a second apparatus to permit the second apparatus to modify stored voice recognition information based on a relationship between the first apparatus and the second apparatus.

(20)

A non-transitory computer-readable medium having embodied thereon a program, which when executed by a processor of a first apparatus causes the first apparatus to perform a method, the method including:

transmitting information permitting a second apparatus to modify stored voice recognition information based on a relationship between the first apparatus and the second apparatus.

(21)

A system including:

a first apparatus; and a second apparatus, wherein the first apparatus transmits information permitting the second apparatus to modify stored voice recognition information based on a relationship between the first apparatus and the second apparatus.

(22)

An information processing apparatus including:

a control unit configured to change a process related to voice recognition of a first device based on a relationship between devices having a voice recognition function.

(23)

The information processing apparatus according to (22), wherein the control unit controls whether to accept an activation word causing the first device to perform the process related to the voice recognition based on a distance between the devices.

(24)

The information processing apparatus according to (23), wherein the control unit accepts the activation word of the device positioned within a predetermined range of the first device.

(25)

The information processing apparatus according to (24), wherein the control unit records the activation word accepted from the device in an activation word storage unit.

(26)

The information processing apparatus according to any one of (22) to (25), wherein the control unit accepts dictionary information from a device other than the first device based on the relationship between the devices, the dictionary information containing at least an activation word used by the device for the voice recognition.

(27)

The information processing apparatus according to (26), wherein the dictionary information contains the activation word of another device received by the device.

(28)

The information processing apparatus according to (26) or (27), wherein, when the dictionary information is present on a server connected to the first device via a network, the control unit receives, instead of the dictionary information, information indicating a location of the dictionary information in the network from the device.

(29)

The information processing apparatus according to any one of (26) to (28), wherein the control unit receives the dictionary information from the device positioned within a predetermined range of the first device.

(30)

The information processing apparatus according to any one of (26) to (29), wherein the control unit causes a sending unit to send the dictionary information of the first device to the device positioned within a predetermined range of the first device.

(31)

The information processing apparatus according to any one of (26) to (30), wherein, when the device positioned within a predetermined range of the first device is positioned outside the predetermined range, the control unit deletes the dictionary information of the device.

(32)

The information processing apparatus according to any one of (26) to (30).

wherein the control unit deletes the dictionary information that has not been updated for a predetermined period of time.

(33)

The information processing apparatus according to any one of (26) to (30), wherein, when a predetermined time passes after the dictionary information is received, the control unit deletes the dictionary information.

(34)

The information processing apparatus according to any one of (22) to (33), further including:

a similarity determination unit configured to determine a similarity of a word, wherein, when the similarity determination unit determines that an activation word of the first device and the activation word of a device other than the first device are identical or similar, the control unit issues a warning to a user of the first device.

(35)

The information processing apparatus according to any one of (22) to (34), further including:

a similarity determination unit configured to determine a similarity of a word, wherein, when the similarity determination unit determines that an activation word of the first device and the activation word of a device other than the first device are identical or similar, the control unit instructs a user of the first device to temporarily change the activation word of the first device.

(36)

The information processing apparatus according to any one of (22) to (34), further including:

a similarity determination unit configured to determine a similarity of a word, wherein when the similarity determination unit determines that an activation word of the first device and the activation word of a device other than the first device are identical or similar, the control unit prevents the voice recognition function of the first device from functioning while the device other than the first device is positioned within a predetermined range of the first device.

(37)

The information processing apparatus according to any one of (22) to (36), wherein the relationship between the devices is determined based on communication radio field intensity between the devices.

(38)

An information processing method including:

changing a process related to voice recognition of a first device by an information processing apparatus based on a relationship between devices having a voice recognition function.

(39)

A program for causing a computer to perform:

a process of changing a process related to voice recognition of a first device based on a relationship between devices having a voice recognition function.

REFERENCE SIGNS LIST 100 voice recognition device
110 communication unit
120 control unit
130 similarity determination unit
140 microphone
150 activation word recognition unit
160 output unit
170 activation word dictionary DB
180 other device activation word dictionary DB
200 glass type terminal
300 vending machine
400 server

The invention claimed is:

1. A first apparatus comprising:
a communication unit configured to transmit information permitting a second apparatus to temporarily modify stored voice recognition information associated with at least one of the first apparatus or the second apparatus while a physical relationship exists between the first apparatus and the second apparatus when the first apparatus and the second apparatus have the same or similar stored voice recognition information to prevent activating voice recognition without being intended by a user,
wherein the temporarily modified voice recognition information comprises at least one voice activation word stored in a dictionary associated with the at least one of the first apparatus or the second apparatus,
wherein the physical relationship between the first apparatus and the second apparatus comprises the first apparatus being within a predetermined range of the second apparatus,
wherein the stored voice recognition information of the first apparatus is deleted by the second apparatus when the first apparatus moves from within the predetermined range to outside the predetermined range of the second apparatus, and
wherein the communication unit is implemented via at least one processor.

2. The first apparatus of claim 1, wherein the communication unit is configured to provide or authorize, for receipt at the second apparatus, first voice recognition information as the transmitted information based on the physical relationship between the first apparatus and the second apparatus.

3. The first apparatus of claim 1, wherein the predetermined range is a distance between the first apparatus and the second apparatus.

4. The first apparatus of claim 1, wherein the physical relationship between the first apparatus and the second apparatus comprises an amount of time since communication between the first apparatus and the second apparatus.

5. The first apparatus of claim 1, wherein the physical relationship between the first apparatus and the second apparatus comprises a communication radio field intensity between the first apparatus and the second apparatus.

6. The first apparatus of claim 1, wherein the stored voice recognition information comprises a user specific dictionary associated with the at least one of the first apparatus or the second apparatus storing the at least one voice activation word and at least one voice recognition word other than the at least one voice activation word.

7. The first apparatus of claim 1,
wherein the communication unit transmits the stored voice recognition information of the first apparatus to be stored by the second apparatus when the first apparatus moves within the predetermined range of the second apparatus.

8. The first apparatus of claim 2, wherein the stored voice recognition information associated with the second apparatus comprises second voice recognition information associated with the second apparatus.

9. The first apparatus of claim 2, wherein the second apparatus temporarily modifies the stored voice recognition information based on the physical relationship between the first apparatus and the second apparatus by updating the stored voice recognition information to include the first voice recognition information.

10. The first apparatus of claim 2, wherein the second apparatus receives the first voice recognition information from a server.

11. The first apparatus of claim 10, wherein the second apparatus receives the first voice recognition information from the server based on the second apparatus receiving identification information of the first apparatus from the first apparatus.

12. The first apparatus of claim 8, wherein the second apparatus temporarily modifies the stored voice recognition information based on the physical relationship between the first apparatus and the second apparatus by updating the second voice recognition information to include the first voice recognition information.

13. The first apparatus of claim 8, wherein the second apparatus temporarily modifies the first voice recognition information based on the physical relationship between the first apparatus and the second apparatus by updating the stored voice recognition information to remove the first voice recognition information from the stored voice recognition information.

14. The first apparatus of claim 8, wherein the second apparatus compares the first voice recognition information with the second voice recognition information.

15. The first apparatus of claim 8, wherein at least one of the first apparatus or the second apparatus inactivates voice recognition functions when the first voice recognition information is the same or similar to the second voice recognition information.

16. The first apparatus of claim 15, wherein the first voice recognition information and the second voice recognition information is the same or similar based on phonetic symbol string analysis.

17. The first apparatus of claim 8, wherein at least one of the first apparatus or the second apparatus issues a warning of potential voice recognition conflict if the first voice recognition information and the second voice recognition information is the same or similar.

18. The first apparatus of claim 17, wherein the first voice recognition information and the second voice recognition information is the same or similar based on phonetic symbol string analysis.

19. A method comprising:
transmitting information from a first apparatus to a second apparatus to permit the second apparatus to temporarily modify stored voice recognition information associated with at least one of the first apparatus or the second apparatus while a physical relationship exists between the first apparatus and the second apparatus when the first apparatus and the second apparatus have the same or similar stored voice recognition information to prevent activating voice recognition without being intended by a user,
wherein the temporarily modified voice recognition information comprises at least one voice activation word stored in a dictionary associated with the at least one of the first apparatus or the second apparatus,
wherein the physical relationship between the first apparatus and the second apparatus comprises the first apparatus being within a predetermined range of the second apparatus, and
wherein the stored voice recognition information of the first apparatus is deleted by the second apparatus when the first apparatus moves from within the predetermined range to outside the predetermined range of the second apparatus.

20. A non-transitory computer-readable medium having embodied thereon a program, which when executed by a processor of a first apparatus causes the first apparatus to perform a method, the method comprising:
transmitting information from a first apparatus to a second apparatus to permit the second apparatus to temporarily modify stored voice recognition information associated with at least one of the first apparatus or the second apparatus while a physical relationship exists between the first apparatus and the second apparatus when the first apparatus and the second apparatus have the same or similar stored voice recognition information to prevent activating voice recognition without being intended by a user,
wherein the temporarily modified voice recognition information comprises at least one voice activation word stored in a dictionary associated with the at least one of the first apparatus or the second apparatus,
wherein the physical relationship between the first apparatus and the second apparatus comprises the first apparatus being within a predetermined range of the second apparatus, and
wherein the stored voice recognition information of the first apparatus is deleted by the second apparatus when the first apparatus moves from within the predetermined range to outside the predetermined range of the second apparatus.

21. A system comprising:
a first apparatus; and
a second apparatus,
wherein the first apparatus transmits information permitting the second apparatus to temporarily modify stored voice recognition information associated with at least one of the first apparatus or the second apparatus while a physical relationship exists between the first apparatus and the second apparatus when the first apparatus and the second apparatus have the same or similar stored voice recognition information to prevent activating voice recognition without being intended by a user,
wherein the temporarily modified voice recognition information comprises at least one voice activation word stored in a dictionary associated with the at least one of the first apparatus or the second apparatus,
wherein the physical relationship between the first apparatus and the second apparatus comprises the first apparatus being within a predetermined range of the second apparatus, and
wherein the stored voice recognition information of the first apparatus is deleted by the second apparatus when the first apparatus moves from within the predetermined range to outside the predetermined range of the second apparatus.

* * * * *